Feb. 29, 1972  S. GOLDFEIN  3,645,961

IMPACT RESISTANT CONCRETE ADMIXTURE

Filed Dec. 5, 1967

INVENTOR
SOLOMON GOLDFEIN

BY Harry M. Saragovitz
Edward J. Kelly
Herbert Berl
John W. Potest, Jr.
ATTORNEYS United States Patent Office 3,645,961
Patented Feb. 29, 1972

3,645,961
IMPACT RESISTANT CONCRETE ADMIXTURE
Solomon Goldfein, 1317 Jefferson Ave.,
Falls Church, Va. 22042
Continuation of application Ser. No. 425,367, Jan. 13, 1965. This application Dec. 5, 1967, Ser. No. 688,261
Int. Cl. C08f 45/16; C08g 51/16
U.S. Cl. 260—37 N                                3 Claims

ABSTRACT OF THE DISCLOSURE

The invention is an impact resistant concrete product comprising an admixture of inorganic hydraulic cement and selected aggregate, together with a plurality of selected fibers substantially uniformly distributed throughout said admixture.

---

The invention described herein may be manufactured and used by or for the Government of the United States of America for governmental purposes without the payment to me of any royalties thereon.

This application is a continuation of my copending application, entitled Impact Resistant Admixture, Ser. No. 425,367, which was filed Jan. 13, 1965, now abandoned.

Inorganic hydraulic cement compositions, commonly referred to as concrete products, have long been recognized as highly desirable for construction purposes, especially for use in structures subject to heavy loading, high external or internal pressures, etc., where weight of the structure is not a critical factor.

Considerable research has been devoted to improvement of the structural characteristics of concrete including weather resistance, tensile strength, resilience, load bearing etc. In addition, extensive investigation has been made of various means for reducing the weight factor in concrete structures. In general, these investigations have involved the introduction of various additives and the determination of appropriate curing techniques. For example, iron rods and wire mesh have been utilized to increase the load bearing capacity of concrete beam sections and to reinforce concrete slabs, respectively.

It is well recognized that concrete bomb shelters, for example, not only must have a substantial load bearing capacity but must be capable of withstanding tremendous blast forces, as well, and that extensive steel reinforcement must be employed to prevent shattering of the concrete upon impact. In consideration of this deficiency, various materials have been added to concrete to distribute the internal stresses throughout the structure. To date, however, the admixtures containing glass fibers, asbestos fibers, glass wool sandings, diatomaceous earth and the like have afforded an impact shatter resistance substantially less than that required in bomb shelter applications. It will be appreciated that a high impact shatter resistant concrete admixture suitable for use in bomb shelter applications is needed and would be welcomed as a substantial advancement of the art. Accordingly, It is an object of this invention to provide a concrete admixture wherein internal stresses due to impact are distributed throughout the concrete casting.

It is another object of this invention to provide a concrete admixture having an appreciable resiliency characteristic.

It is still another object of this invention to provide a concrete admixture which is relatively lightweight per a given load characteristic.

It is an additional object of this invention to provide a concrete admixture which will not crack and spall when subjected to cycles of water absorption, freezing and thawing.

Other objects of this invention will be appreciated upon a more comprehensive understanding of the invention for which reference is had to the following specification and drawings wherein.

Figure 2:
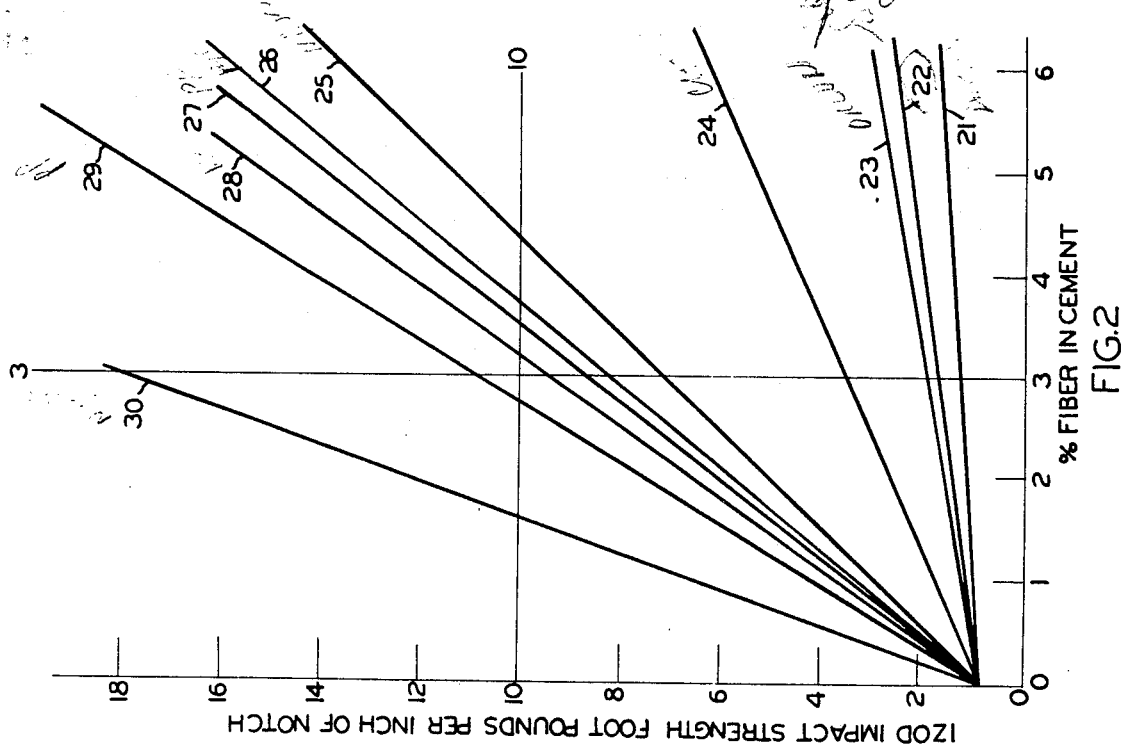
FIG. 2 is a graphic presentation of the results obtained upon subjection of the same concrete admixtures to an impact strength test.

Briefly, this invention is an inorganic hydraulic cement composition containing a random distribution of selected fibrous material which affords a flexure strength substantially greater than conventional nonfibrous concrete and other fibrous concrete admixtures.

For purposes of this disclosure, hydraulic cement is considered as a class of materials capable of setting and hardening under water due to interaction of the water and the constituents of the cement. It will be appreciated that the aforesaid class designation is in full conformance with recognized reference texts such as Materials of Construction, Prof. A. P. Mills, Cornell University, edited by Prof. H. W. Hayward, M.I.T., published by John Wiley & Sons, Inc., 1931 and with ASTM designation C219, Terms Relating to Hydraulic Cement.

The known inorganic hydraulic cements contain in composition and in various proportions principally lime, silica, magnesia, alumina and iron oxides. Such inorganic hydraulic cements include natural cement, portland cement, portland blast furnace slag cement, portland pozzolan cement and slag cement as defined by the American Society of Testing MWtaaerislhoJyelinkg of Testing Materials (ASTM Designation C595, "Specifications for Blended Hydraulic Cements"). It is recognized that the above mentioned cements differ principally in their origin and that they have similar balanced compositions producing strong cementitious products and requiring approximately the same quantity of water to make them set.

The admixture of this invention may constitute a mixture of cement, sand and gravel in a conventional ratio of 1:2:4, or otherwise, with fibrous material taken from the group consisting of nylon, polypropylene, polyvinylidene chloride and polyethylene.

As will be described hereinafter, less than 3% by weight of fibrous material taken from the above-mentioned grouping will not only greatly increase the impact strength but will substantially improve the flexural strength as well.

As is well known, fiber reinforced admixtures, in general, can easily be made by first preparing the admixture by conventional means and then adding the fibers to the admixture gradually and with constant mixing until the fibers are properly dispersed throughout the admixture. For example, in accordance with the present invention, a 1:2:4 concrete suitable for floors, beams, columns, arches, engines, machine foundations, sewers, pipe, etc., may first be made by mixing 94 pounds of cement, 188 pounds of sand and 376 pounds of gravel. Approximately 37.6 pounds of water are then added with constant stirring until a uniform mixture has been formed comprising a water-cement ratio of 0.40. The mixing is continued while 21 pounds of one-inch nylon fibers are gradually added until they also are uniformly mixed in with the concrete. The mixture may now be poured into a mold and handled in exactly the same fashion as ordinary concrete. It may be spread, tamped and vibrated. Hydraulic cements containing additives such as air entraining agents may also be used in exactly the same fashion.

Another method of making the concrete comprises mixing the cement, sand, gravel and fibers together dry and then adding the water. The first described general method is preferred in the preparation of the concrete admixture of this invention since the presence of the water reduces the friction and hence reduces abrasion of the fibers.

It is readily apparent that incorporation of the fibers such as described herein will reduce the weight of the concrete-fiber composite, since the fibers have a lower density than the concrete and are replacing a volume of concrete equal to the volume of the fibers.

In accordance with the invention, various lengths of fibers may be employed and lengths of fiber as short as ¼ inch or as long as 3 inches have been found to be particularly satisfactory. It will be appreciated, of course, that it is not essential that fibers of uniform length be utilized and that fibers of any reasonable length may be accommodated in any combination, if desired. It has been found, however, that strength increases with the length of the fibers and that difficulty of mixing increases accordingly. That is, as the length of the fibers is increased, there is a greater tendency of the mixture to ball. Consequently, in the preferred embodiment of this invention the fibrous material is approximately ¼ inch to 3 inches in length.

Figure 1:
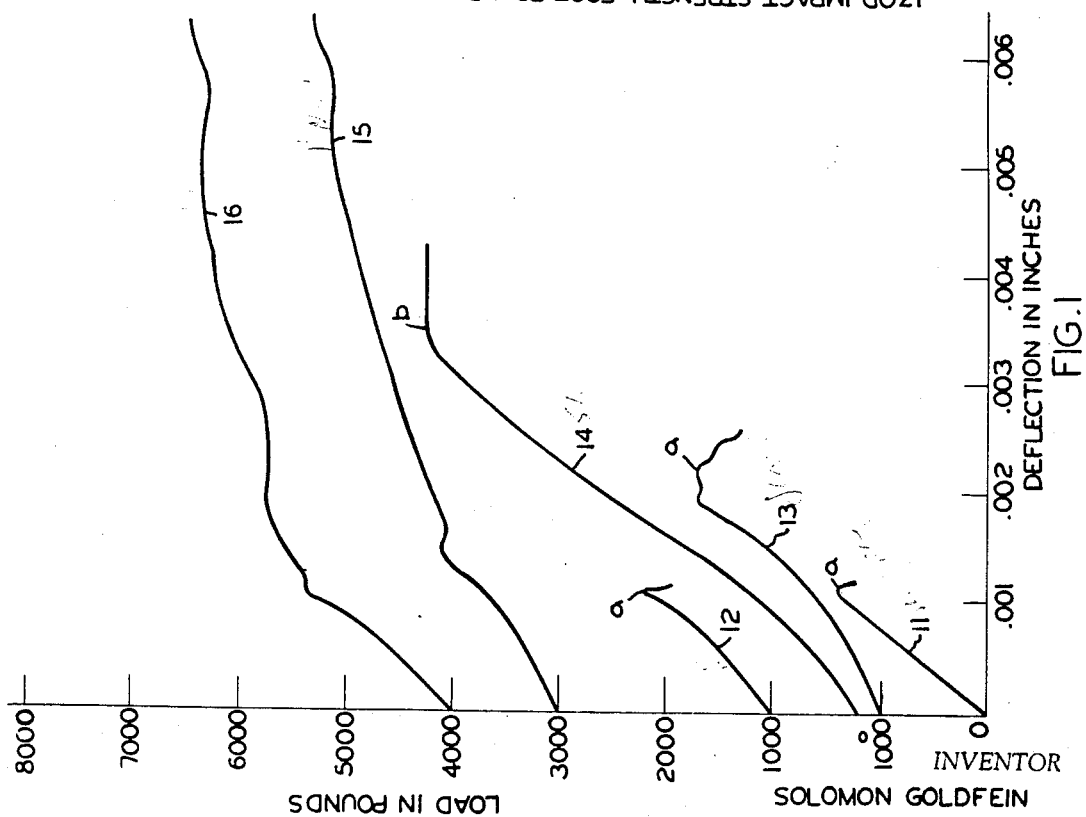
FIG. 1 is a graphic presentation of the results obtained upon subjection of various concrete admixtures of similar size and configuration to a load test.

The load deflection curves 11 through 16 in FIG. 1 were determined for selected cementitious admixtures:

Mortar w/c=0.45; neat cement w/c—0.35; neat cement, sand, plus one inch glass fibers w/c=0.38; neat cement, plus one inch steel wire w/c=0.40; neat cement, plus one inch nylon fibers w/c=0.40; and neat cement plus three inch nylon fibers w/c=0.40, respectively.

The various admixtures were cast in a uniform rectangular form 6 by 1½ inches and each was subjected to substantially the same curing conditions for a period of ten days. The curves 11 through 16 were obtained in accordance with standard flexure strength test procedure, in particular. Federal Test Method Standard 406, Test Method No. 1031.

It will be noted that each of the curves in the family of curves 11 through 16 has substantially the same initial slope. This may be attributed to the fact that the strength of the cement is of primary significance as loading is first applied to the test specimen. As the loading is increased, the effect of the particular fibrous material in each specimen bar comes into paly and each curve exhibits its own significant character.

Curves 11 and 12 depict the load deflection curve for reference specimen bars of mortar (cement, sand, water) and neat cement, respectively. Curve 13 is the load deflection curve for a neat cement containing 1 inch glass fiber resin coated with sand. Curves 11, 12, and 13 each indicate, at point a, the load limit of the specimen bar has been reached and that a fracture has occurred.

Curve 14 is the load deflection curve for a specimen bar of neat cement containing 1 inch spring steel wire, 0.011 inch diameter. It will be noted that this curve continues to maintain its initial slope until a load limit point indicated at b, is reached. This substantially constant slope is due to the high modulus of the steel reinforcement. The level portion of the curve beyond point b indicates that the specimen bar has gradually deformed as the wires pull out of the specimen but that actual fracture has not yet occurred.

Curves 15 and 16 are the load deflection curves for specimen bars of neat cement containing 1 inch nylon fiber and 3 inch nylon fiber, respectively. It is readily apparent from these characteristic curves that by the addition of nylon fibers a substantial increase in a strength is obtained. Also, it will be noted that the bars containing nylon fibers continue to support a load after the cement evidently had failed but the slope of the curves is less steep. Moreover, several unusual effects peculiar to the specimen bars containing nylon fiber were noted. First, upon release of the load after extensive loading, the bars returned to their initial shape with only a few cracks evident in the area where the load was applied.

Secondly, the specimen bars containing nylon fibers did not break or shatter but maintained their integrity upon being struck against a solid steel surface with great force. This characteristic clearly indicated that the nylon fibers were uniformly dispersed and were well bonded to the cement.

The impact strength curves 21 through 30 in FIG. 2 were determined for selected cementitious admixtures, namely Dacron (2.03% 6 denier yarn), glass (2.92% 60 ends yarn), Orlon (1.55% 6 denier yarn), cotton (2.98% 16 denier yarn), nylon (2.4% 15 denier yarn), polyvinylidene chloride (2.3% 24 denier monofilament), polyethylene (2.92% F309 denier monofilament), nylon (2.65% 235 denier yarn-moist cure) polypropylene (5.8% 630 denier yarn), nylon (2.85% 235 denier-moist cure), respectively.

Each of these admixtures had a uniform water/cement ratio (0.4) and utilized the same type of cement. In each case plastisol molds were prepared to form Izod impact test specimens. Impact strength was determined in accordance with standard test procedures, in particular, Federal Test Method Standard 406, Test Method No. 1071.

FIG. 2 is a graphic presentation of impact strength per inch of notch for selected percentages of fiber content. All fibers appeared to be capable of reinforcing cement to some degree but impact strength of the cement did not appear to be in a direct correlation with tensile strength of the fiber. For example, curve 22 which depicts impact strength for cement containing 3% glass fiber shows that the introduction of glass, tensile strength 250,000–315,000 p.s.i., did not appreciably reinforce the cement. The lack of parallel is evident, as well, in curves 21 and 24 which depict the impact strength for cement containing Dacron and cotton, respectively, both of which are relatively weak fibers (42,000–125,000 p.s.i.).

It will be noted (FIG. 2) that for a 3 percent content of fibrous material of Dacron, glass, Orlon or cotton, curves 21, 22, 23, 24, respectively, the impact strength did not exceed 3.5 foot pounds per inch per notch. In comparison, the curves 25, 26, 27, 28, 29 and 30 which depict impact strength for specimens including fibrous material of nylon, polyvinylidene chloride, polyethylene, nylon, polypropylene, and nylon, respectively, show that for a comparable content the impact is in excess of 7 foot pounds per inch per notch. It will be noted that in the nylon fiber specimen of curve 30, a 3 percent content afforded an impact strength of 18 foot pounds per inch of notch. The tensile strength of the nylon fiber in this case was 66,000–125,000 p.s.i.

In essence, the cementitious admixtures of this invention containing fibrous material of the nylon, polypropylene, polyethylene and polyvinylidene chloride variety provide a superior product not only in load bearing characteristic but in impact strength characteristic, as well. The impact strength improvement is due, in part, to the high energy adsorption characteristic and the high resiliency characteristic of the selected fibrous material. The energy absorption characteristic which is a function of the elongation and tensile strength properties of the material, appears to be the most significant factor. It has been observed that this characteristic is a product function of the two properties, that is, comparable results are obtained in the first instance of high tensile strength and relatively low elongation and in the second instance of relatively low tensile strength and high elongation.

Moreover, it has been found that the selected fibrous materials in each of the cementitious admixtures of this invention are especially compatible with high pH medium, may be readily bonded to the cement, and may be uniformly distributed therein. In addition, it has been found that each of these selected fibrous materials has a minimum absorption characteristic such that the critical viscosity of the concrete per the introduction of a prescribed amount of water is not significantly upset by the inclusion of the fibrous material.

The superior resistance to weathering characteristic of the fibrous admixture of this invention was demonstrated by a cycle of tests on flexural test specimens containing 3% nylon. Use was made of test specimens which had been stressed until the test machine indicated the yield stress had been exceeded, and that the fibers were carrying a large proportion of the load. Examination of the specimens showed that they had regained their flat shapes, and that small hairline cracks existed in both the top and bottom of the beam. The test consisted of 3 cycles of the following treatment: (a) immersion in water for 24 hours at 73° F. followed by (b) freezing at 10° F. for 24 hours followed by (c) drying in an oven at 160° F. for 24 hours. Examination of the specimens after 3 cycles showed that no further cracks had appeared and no evidence of spalling existed.

For the previously described purpose of this invention, blast resistant construction, an admixture containing relatively short length nylon fibrous material is preferred. It is understood, of course, that other fibrous material taken from the group consisting of nylon, polypropylene, polyethylene, and polyvinylene chloride or their equivalent in terms of energy absorption and resiliency characteristic may be equally suitable, if not preferred, in other applications of the product of this invention.

Finally it is understood that this invention is to be limited only by the scope of the claims appended hereto.

What is claimed is:

1. A blast resistant concrete product comprising an admixture of inorganic hydraulic cement and selected aggregate, together with a plurality of finite fibers substantially uniformly distributed throughout said admixture, said fibers being substantially ¼ inch to three inches in length and of a material selected from the group consisting of nylon, polypropylene, polyethylene, and polyvinylidene chloride.

2. A blast resistant concrete product comprising an admixture of inorganic hydraulic cement and selected aggregate, together with a plurality of finite nylon fibers substantially uniformly distributed throughout said admixture, said finite fibers being approximately one inch in length and said plurality thereof constituting approximately 3 percent by weight of said admixture.

3. A blast resistant concrete product comprising an admixture of inorganic hydraulic cement and selected aggregate together with a plurality of finite fibers of polyvinylidene chloride material and substantially uniformly distributed throughout said admixture.

References Cited

UNITED STATES PATENTS

| 3,056,686 | 10/1962 | Shannon | 260—41 A |
| 3,214,393 | 10/1965 | Sefton | 260—41 A |
| 3,272,765 | 9/1966 | Sefton | 260—41 |
| 3,044,547 | 7/1962 | Jarboe | 106—99 |
| 2,793,130 | 5/1957 | Shannon et al. | 106—99 |

OTHER REFERENCES

Oleesky, Handbook of Reinforced Plastics, Reinhold Publishing Corp., 1964, p. 191 relied on.

MORRIS LIEBMAN, Primary Examiner

S. L. FOX, Assistant Examiner

U.S. Cl. X.R.

106—90; 260—41 A, 41R

REEXAMINATION CERTIFICATE (857th)

United States Patent [19]

Goldfein

[11] B1 3,645,961

[45] Certificate Issued May 24, 1988

[54] IMPACT RESISTANT CONCRETE ADMIXTURE

[76] Inventor: Solomon Goldfein, 1317 Jefferson Ave., Falls Church, Va. 22042

Reexamination Request:
No. 90/001,325, Sep. 8, 1987

Reexamination Certificate for:
Patent No.: 3,645,961
Issued: Feb. 29, 1972
Appl. No.: 688,261
Filed: Dec. 5, 1967

Related U.S. Application Data

[63] Continuation of Ser. No. 425,367, Jan. 13, 1965, abandoned.

[51] Int. Cl.$^4$ .............................................. C04B 16/06
[52] U.S. Cl. ............................................ 106/99; 524/5; 524/7; 524/8
[58] Field of Search ............................................ 106/99

[56] References Cited

U.S. PATENT DOCUMENTS

| Re. 12,594 | 1/1907 | Hatschek | 162/118 |
|---|---|---|---|
| 662,643 | 11/1900 | Griswold | 106/93 |
| 824,012 | 6/1906 | Harris | 106/93 |
| 837,717 | 12/1906 | Perry | 264/121 |
| 844,530 | 2/1907 | Von Mollenbruck | 106/93 |
| 929,002 | 7/1907 | Norton | 106/99 |
| 2,793,130 | 5/1957 | Shannon et al. | 427/403 |
| 3,044,547 | 7/1962 | Jarboe, Jr. | 106/99 |
| 3,056,686 | 10/1962 | Shannon | 521/25 |
| 3,214,393 | 10/1965 | Sefton | 521/54 |
| 3,272,765 | 9/1966 | Sefton | 521/54 |
| 3,363,689 | 1/1968 | Smith et al. | 166/292 |

OTHER PUBLICATIONS

Oleesky et al; Handbook of Reinforced Plastics; Reinhold Publishing Corp. (1964) p. 191.

"Plastic Fibrous Reinforcement for Portland Cement," U.S. Army Engineer Research and Development Laboratories Technical Report 1757-TR, notwithstanding the date Oct. 29, 1963 which appears on the cover of the Army Technical Report, the actual date of publication of the Army Technical Report is believed to be Apr. 5, 1964 when said report was made available to the public by the National Technical Information Service but in no case was the report published prior to Jan. 22, 1964, the date when it was received by the Defense Document Center.

"Fibrous Reinforcement for Portland Cement," Rubber and Plastic Age, vol. 46, No. 1, Jan. 1965, at 51-53.

"Fibrous Reinforcement for Portland Cement," Modern Plastics Magazine, vol. 42, No. 8, Apr. 1965, at 156-159.

*Primary Examiner*—Steven Capella

[57] ABSTRACT

The invention is an impact resistant concrete product comprising an admixture of inorganic hydraulic cement and selected aggregate, together with a plurality of selected fibers substantially uniformly distributed throughout said admixture.

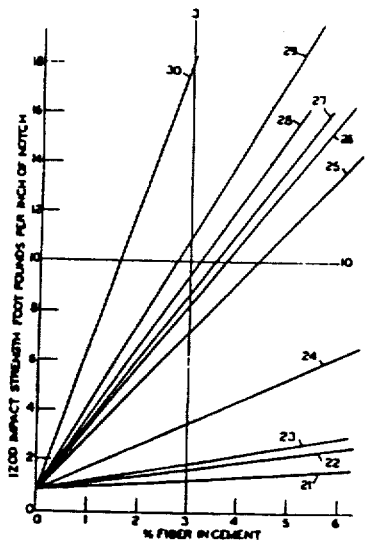

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-3 is confirmed.

* * * * *